(12) United States Patent
Ray et al.

(10) Patent No.: US 9,436,764 B2
(45) Date of Patent: Sep. 6, 2016

(54) NAVIGATION TO POPULAR SEARCH RESULTS

(75) Inventors: Paul Ronald Ray, Redmond, WA (US); Brian MacDonald, Bellevue, WA (US); Steven W. Macbeth, Redmond, WA (US); Mira Lane, Redmond, WA (US); Laura Kern, Seattle, WA (US); Rodney Coleman Edwards, New York, NY (US); Steven Tullis, Redmond, WA (US); Sanaz Ahari, Kirkland, WA (US); Daniel Marantz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

(21) Appl. No.: 12/826,205

(22) Filed: Jun. 29, 2010

(65) Prior Publication Data

US 2011/0320443 A1    Dec. 29, 2011

(51) Int. Cl.
*G06F 17/30* (2006.01)

(52) U.S. Cl.
CPC .............................. *G06F 17/30864* (2013.01)

(58) Field of Classification Search
CPC ................................................ G06F 17/30864
USPC .......................................................... 707/722
See application file for complete search history.

(56) References Cited

U.S. PATENT DOCUMENTS

| | | | |
|---|---|---|---|
| 6,925,608 B1 | 8/2005 | Neale | |
| 7,092,935 B2 | 8/2006 | Yourlo | |
| 7,299,222 B1 * | 11/2007 | Hogan et al. | |
| 7,334,196 B2 | 2/2008 | Suppan | |
| 7,747,626 B2 | 6/2010 | Grimm | |
| 8,239,367 B1 * | 8/2012 | Zamir et al. | 707/710 |
| 8,495,499 B1 * | 7/2013 | Denise | 715/738 |
| 8,577,868 B1 * | 11/2013 | Zamir et al. | 707/710 |
| 2002/0154167 A1 * | 10/2002 | Parsons et al. | 345/764 |
| 2002/0188620 A1 | 12/2002 | Doss et al. | |
| 2003/0088553 A1 | 5/2003 | Monteverde | |
| 2004/0186775 A1 * | 9/2004 | Margiloff et al. | 705/14 |
| 2004/0255237 A1 | 12/2004 | Tong | |
| 2005/0235343 A1 * | 10/2005 | Stephens | 726/6 |
| 2005/0289140 A1 | 12/2005 | Ford | |

(Continued)

FOREIGN PATENT DOCUMENTS

CN     1806240 A      7/2006
KR   100892989 B1    4/2009

OTHER PUBLICATIONS

Article entitled "14 Popular Browser Toolbars Reviewed—The Worthwhile and the Worthless" dated Jan. 18, 2008 by Randfish.*

(Continued)

*Primary Examiner* — Mahesh Dwivedi
(74) *Attorney, Agent, or Firm* — Dave Ream; Tom Wong; Micky Minhas

(57) ABSTRACT

Systems, methods, and computer media for enhancing search results, as well as user interfaces for performing search queries and navigating search results, are provided. A search query is received from a user. A plurality of web pages relevant to the search query are identified. At least one of the relevant web pages is identified as popular. A search result page is generated including a search result listing and a search result page header. The search result page header includes a link to the popular web page to provide the user with a quick and easy way to select a popular web page relevant to the user's search query.

17 Claims, 7 Drawing Sheets

(56) References Cited

U.S. PATENT DOCUMENTS

| | | | |
|---|---|---|---|
| 2006/0036966 A1* | 2/2006 | Yevdayev | 715/779 |
| 2006/0101353 A1 | 5/2006 | Clark | |
| 2006/0155728 A1* | 7/2006 | Bosarge | 707/100 |
| 2006/0282416 A1* | 12/2006 | Gross et al. | 707/3 |
| 2007/0038622 A1* | 2/2007 | Meyerzon et al. | 707/5 |
| 2007/0192281 A1* | 8/2007 | Cradick et al. | 707/2 |
| 2007/0214434 A1 | 9/2007 | Rydenhag | |
| 2007/0276803 A1 | 11/2007 | Shakib et al. | |
| 2008/0189281 A1* | 8/2008 | Cancel et al. | 707/6 |
| 2008/0313144 A1* | 12/2008 | Huston | 707/3 |
| 2009/0006358 A1* | 1/2009 | Morris et al. | 707/5 |
| 2009/0094197 A1 | 4/2009 | Fein | |
| 2009/0115785 A1 | 5/2009 | Grandhi | |
| 2009/0281994 A1 | 11/2009 | Byron | |
| 2010/0057675 A1* | 3/2010 | White et al. | 707/3 |
| 2010/0070928 A1* | 3/2010 | Goodger et al. | 715/838 |
| 2010/0088583 A1* | 4/2010 | Schachter | 715/206 |
| 2010/0281417 A1* | 11/2010 | Yolleck et al. | 715/779 |
| 2011/0010357 A1* | 1/2011 | Kim | 707/708 |
| 2012/0036477 A1* | 2/2012 | Djabarov et al. | 715/811 |
| 2012/0238609 A1* | 9/2012 | Srivastava et al. | 514/389 |

OTHER PUBLICATIONS

Article entitled "Metasearch Engines Expands your Horizon" dated Sep. 16, 2009, by TimeAtlas.*

Dictionary Definition of "button" by The American Heritage College Dictionary.*

Dictionary Definition of "button" by the American Heritage College Dictionary, Copyright 2004.*

International Search Report with Written Opinion mailed Feb. 21, 2012 in PCT/US2011/041864, 11 pages.

Roth, et al., "Visage: A User Interface Environment for Exploring Information", Published Date: 1996, 8 pages, http://www.cs.cmu.edu/~sage/PDF/Visage.pdf.

Karlson, et al., "FaThumb: A Facet-based Interface for Mobile Search", Published Date: Apr. 22, 2006, pp. 711-720, CHI 2006 Proceedings, Montreal, Quebec, Canada, http://research.microsoft.com/pubs/64303/chi2006-fathumb.pdf.

Azagury, et al., "A Novel Navigation Paradigm for XML Repositories", Published Date: 2002, 11 pages, Matam, Haifa, Israel, http://www.haifa.il.ibm.com/projects/storage/xmlfs/papers/xmlfs-jasis.pdf.

"First Office Action and Search Report Issued in Chinese Patent Application No. 201180032504.6", Mailed Date: Feb. 25, 2015, 18 pages.

"Second Office Action Issued in Chinese Application No. 201180032504.6", Mailed Date: Nov. 4, 2015, 12 Pages.

"Office Action Issued in Chinese Patent Application No. 201180032504.6", Mailed Date: May 5, 2016, 11 pages.

* cited by examiner

NAVIGATION TO POPULAR SEARCH RESULTS

BACKGROUND

Internet searching has become increasingly common in recent years. Users have become accustomed to performing keyword and other search queries for a wide range of information. In many instances, typing a keyword into a search engine is simply faster than navigating directly to a desired web page or navigating to a web site and performing a keyword query on the web site itself. As the number of web pages and domains continues to grow, a search query often returns many more results than a user is actually interested in viewing. In an attempt to combat this information overload, conventional search engines often present search results ranked in order of relevance to the user's search query. Even when presented with ranked search results, however, users are often overloaded with unhelpful or undesired search results.

SUMMARY

Embodiments of the present invention relate systems, methods, and computer media for enhancing search results and user interfaces for performing search queries and navigating search results. Using the methods described herein, a search query can be received from a user. A plurality of web pages relevant to the search query can then be identified. At least one of the plurality of relevant web pages can be identified as a popular web page. A first search result page can then be generated. The first search result page includes a search result listing including the at least one popular web page. The search result page also includes a search result page header that includes a link, such as an icon or text, to the popular web page.

Upon receiving a request from a user to select the link in the search result page header and navigate to the popular web page, a second search result page is generated. The second search result page includes both the popular web page and the search result page header including the link.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
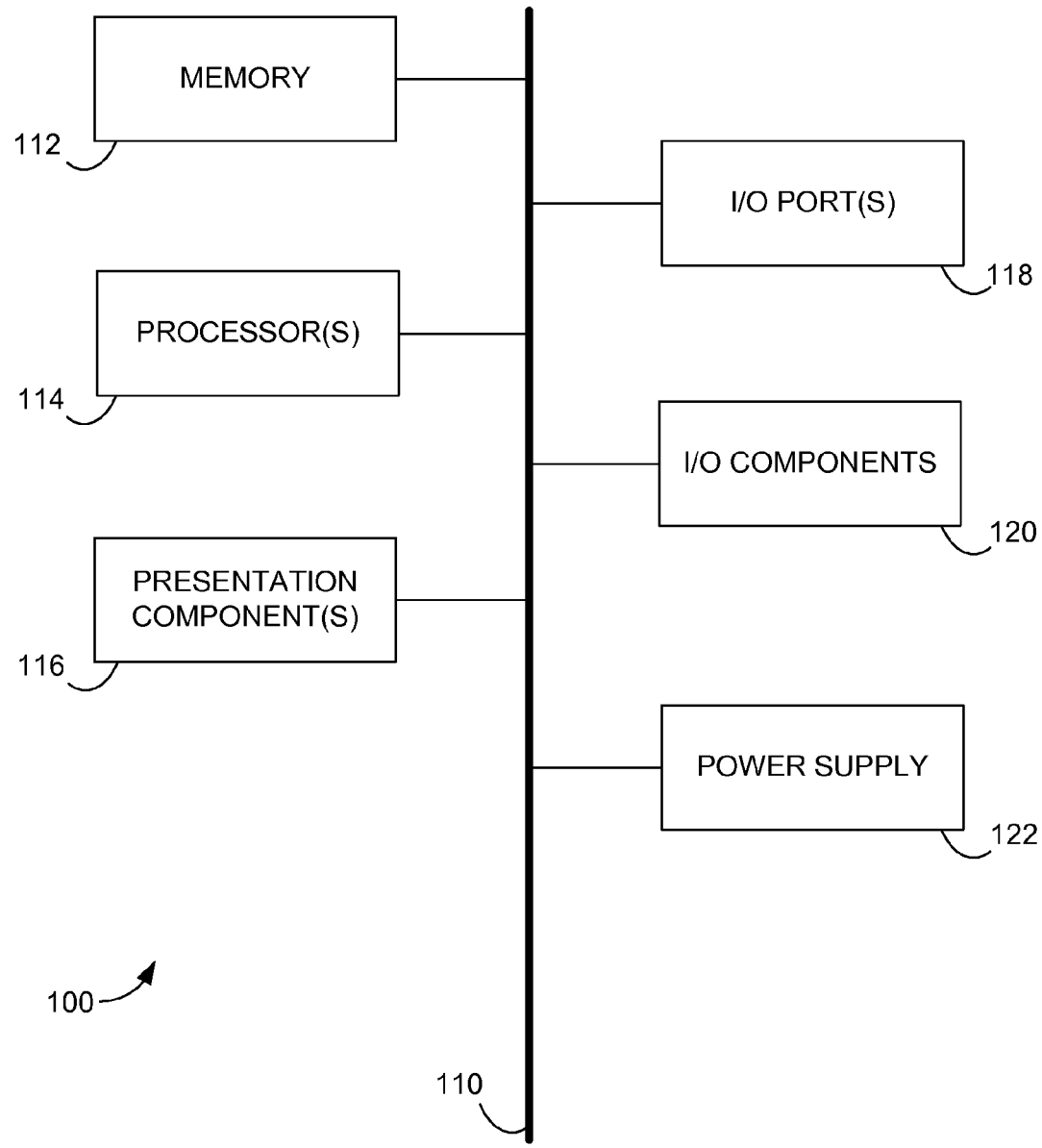
FIG. 1 is a block diagram of an exemplary computing environment suitable for use in implementing embodiments of the present invention.

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention provide systems, methods, and computer media for enhancing search results and user interfaces for performing search queries and navigating search results. In accordance with embodiments of the present invention, a search result page is enhanced before presentation to a user. As discussed above, search queries, such as Internet keyword search queries, produce a large number of results that are often ranked and presented to the user conducting the search in order of relevance. It is often difficult, however, for a user to navigate through the numerous results to find results associated with trusted or popular web pages or domains. For example, if a user searches for a current event, the user may wish to easily identify a highly reputable national news outlet instead of viewing a local news source, even if the local news source is ranked most highly according to relevance.

In accordance with embodiments of the present invention, search results relevant to a user search query are analyzed to determine if any of the results are "popular" web pages or domains that can be presented to the user in an easily accessible way. Popularity can be determined through a number of internal and external metrics, including by analyzing search engine query logs to determine if a particular web page has been viewed a number of times in excess of a popularity threshold. Web pages from the relevant search results that are determined to be popular can then have an icon and/or text link included in the search result page header.

Conventional search result pages include a search result page header and a search result display area. In conventional search result page headers, a keyword entry area, search engine logo, and other informational or search assistance information is included. In accordance with embodiments of the present invention, the search result page header of an enhanced search results page includes one or more links associated with popular web pages. The links may be icons and/or text. Because the links are included in the search result page header, the links are easily visible to the user. When a user clicks on one of the links, a new search result page is generated. The new search result page includes the search result page header, including popular web page links, along with the content of the corresponding popular web page.

The search result page header, including popular web page icons, persists, and "frames" the popular web page, enabling the user to quickly access popular or trusted web pages while maintaining the context of the original search. The number of links to popular web pages and the number of other content items included in the search result page header, as well as the arrangement of the links and other content items, can be determined through ranking.

In one embodiment of the present invention, a search query is received from a user. A plurality of web pages relevant to the search query are identified. At least one of the plurality of relevant web pages is identified as popular. A first search result page is then generated. The first search result page comprises a search result listing including the at least one popular web page. The first search result page also comprises a search result page header that includes a link to the corresponding popular web page.

In another embodiment, a search query is received from a user. A plurality of web pages relevant to the search query are identified. Search query log data is accessed. It is determined that one or more of the plurality of relevant web pages is popular when the search query log data indicates that the web page has been accessed a number of times greater than a popularity threshold. A web page icon database storing one or more icons for each web page or group of related web pages in the database is accessed. At least one icon is retrieved for at least one web page relevant to the search query that is determined to be popular. A first search result page is then generated. The first search result page comprises a search result listing including the at least one popular web page for which the one or more icons were retrieved. The first search page also comprises a search page header including one of the one or more retrieved icons, the icon linking to the corresponding popular web page. The number and arrangement of icons and other content items included in the search result page header are selected through ranking. Upon receiving a request from a user to select the icon in the search result page header and navigate to the corresponding popular web page, a second search result page is generated. The second search result page has both the corresponding popular web page and the search result page header of the search result page.

In still another embodiment, a keyword search query user interface is provided. The user interface comprises a search results page header. The search result page header comprises a keyword search entry area capable of receiving a user keyword search query. The search result page header also comprises one or more navigation buttons that each link to a popular search result web page relevant to the user keyword search query. The one or more navigation buttons are created in response to receiving the user search query and determining one or more relevant websites are popular. The user interface further comprises a search result area for displaying Internet web page links relevant to a received user keyword search query. The search result page header and search result area are part of a first search results page. A user click on the navigation button causes the generation of a second search result page comprising the search result page header and the popular web page to which the navigation button is linked.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As discussed previously, embodiments of the present invention provide methods and computer media for enhancing search results. Conventional search engine user interfaces are discussed in FIGS. 2-3. Embodiments of the present invention will be discussed in reference to FIGS. 4-9.

Figure 2:
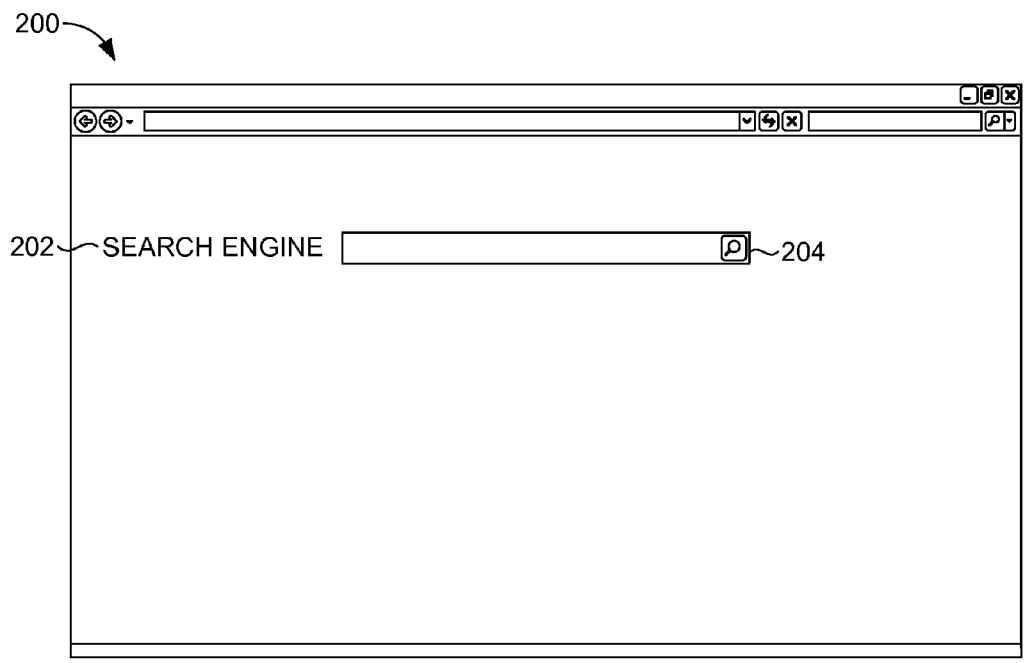
FIG. 2 is a block diagram of a prior art search engine user interface.

FIG. 2 illustrates a block diagram of a conventional search engine user interface 200. Search engines can be accessed through a variety of interfaces and can be designed to search the Internet or intranets. In a typical configuration, a search engine provider operates a web page that allows users to enter keywords. Some search engines allow images, audio or video clips, or other input. The search engine provider will then perform an Internet query to find web pages or domains relevant to the entered keywords. Search engine user interface 200 typically includes a logo, name, or other indicator 202 identifying the search provider. Search engine user interface 200 also typically includes a keyword entry area 204. Conventional search engine user interfaces may include a variety of other features, icons, tabs, or other content.

Figure 3:
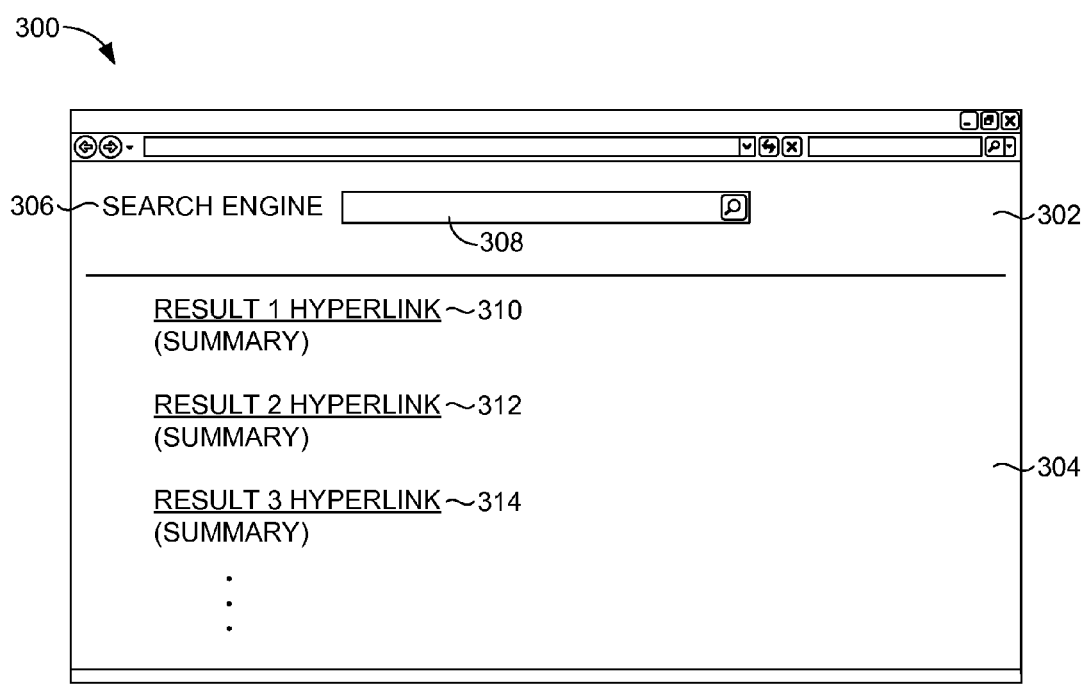
FIG. 3 is a block diagram of a prior art search results page user interface.

FIG. 3 illustrates conventional search result page 300. Search result page 300 is generated after search query is performed with user-entered keywords. Search result page 300 comprises a search result page header 302 and a search result area 304. Search result page header 302 includes a search provider logo 306 and a keyword entry area 308. Search result area 304 provides results for keywords entered into keyword entry area 308. Search result area 304 includes search results 310, 312, and 314 that the search engine has determined are relevant to the keyword query. Search results 310, 312, and 314 are typically ranked in order of decreasing relevance such that result 310 is the most relevant and result 314 is the least relevant. Each of search results 310, 312, and 314 includes a hyperlink to a web page where the relevant content is found, as well as a brief summary of the content or a portion of the content that includes the entered keyword.

As discussed above, this conventional presentation of search results does not allow a user to quickly identify popular, trusted, or otherwise authoritative results. An Internet search may identify 20, 50, 100, or even more results, and popular sources of information relevant to the entered keywords may be ranked low in relevance but be highly desired by the user. In such situations, popular sources are obscured in a conventional search engine user interface and search result display.

Figure 4:
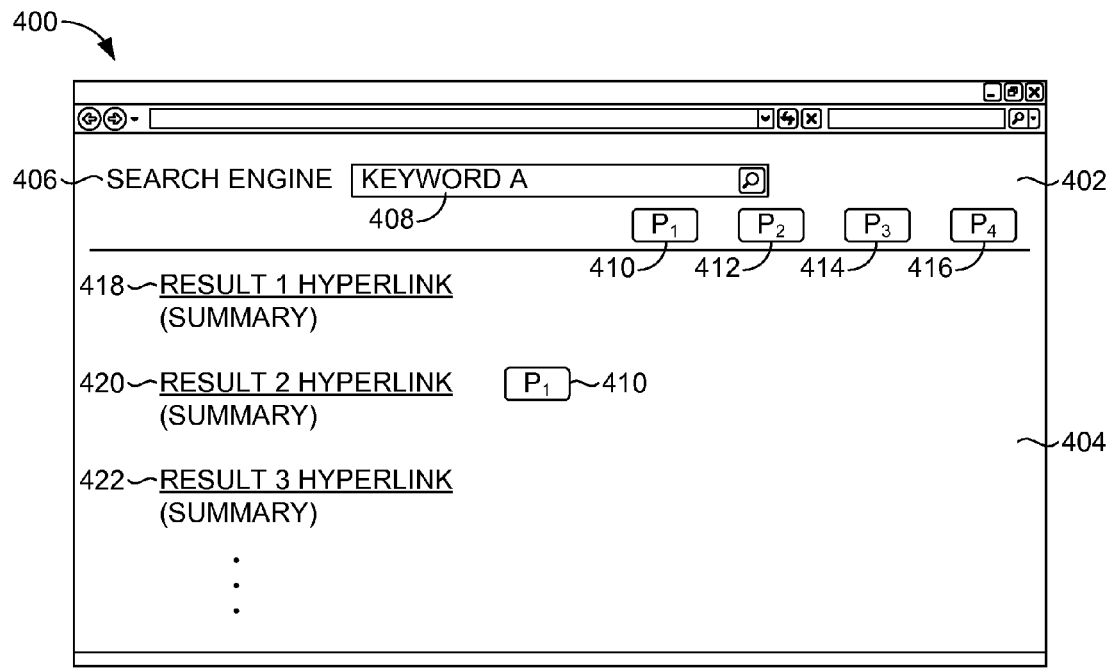
FIG. 4 is a block diagram of an exemplary user interface suitable for implementing embodiments of the present invention, the interface illustrating the first search results page including the search results page header with popular web page icons and a search result listing.

FIGS. 4-9 illustrate search result enhancement and icon-based navigation of search results. FIG. 4 illustrates a search result page 400 having a search result page header 402 and a search results area 404. Similarly to conventional search result page header 302 in FIG. 3, search result page header 402 in FIG. 4 includes search provider identifier 406 and keyword entry area 408. Embodiments of the present invention are also contemplated in which search provider identifier 406 and keyword entry area 408 are not included in search result page header 402.

Search result area 404 displays search results 418, 420, and 422, each search result including a hyperlink and summary. Although search results may be presented in a variety of ways, including a hyperlink and summary for each result is a common method. Each of search results 418, 420, and 422 identifies a web page determined to be relevant to one or more keywords entered in a keyword search query in keyword entry area 408. In the example shown in FIG. 4, "Result 1," "Result 2," and "Result 3," as well as additional results not shown, are determined to be relevant to "Keyword A."

Search results identifying web pages or domains that are trusted, popular, or otherwise authoritative may be difficult to find in search result area 404. For example, if the search engine is configured to return the top 100 results ranked by relevance, and a result identifying a popular web page appears at number 27 out of 100 search results according to relevance, the result identifying the popular web page may not be visible to the user on the first page of search results that are presented. (The user may have to click "next," "page 2," or a similar link to see more search results.) Even if a search result for a popular web page does appear on the first page of results, it may not be one of the first few search results presented, making it harder for the user to find the search result linking to the popular web page.

Popular search result buttons 410, 412, 414, and 416 in search result page header 402 provide easily identifiable links to popular web pages identified by the search results listed in search result area 404. Thus, while search result area 404 contains a number of search results, popular search result buttons are only included in search result header 402 for a subset of the search results that are determined to be popular. Popularity may be determined in a number of ways. In one embodiment, search engine query logs are analyzed to identify web pages frequently navigated to as a result of user keyword searches. A threshold value can be established according to system preferences or needs to determine when a web page or domain is popular. "Popular" web pages as used in this document may also be thought of as authoritative or trusted web pages, the authoritativeness or trustworthiness being reflected in the web pages' popularity. In another embodiment, a list of popular web pages and domains are created that reflect known entities. For example, if a national news network is determined to be a trustworthy source of information, the network's web domain is also determined to be trusted. Other methods of determining popularity are also contemplated.

Popular result buttons 410, 412, 414, and 416 have the symbols "P1," "P2," "P3," and "P4," respectively, which are exemplary symbols indicating "Popular 1," "Popular 2," etc. In one embodiment, each popular result button includes a logo or symbol associated with a company or entity that provides or is otherwise associated with the relevant web page or domain. Thus, if the popular web page is a web page in a national news network's domain, then the popular result button will include the logo or symbol for the national news network. This enables users to easily identify the provider of the popular web page. In some embodiments, both a logo or symbol and text identifying the provider of the web page are included. In still other embodiments, each of popular result buttons 410, 412, 414, and 416 includes text only. If the web page provider does not have a logo or does not have a logo suitable for display, either the name of the provider or a system-generated logo may be used.

To provide further context to a user, in some embodiments, popular result buttons 410, 412, 414, and 416 are also presented in search result area 404 along with the search result that corresponds to the popular web page. For example, in FIG. 4, popular result button 410, displaying "P1" is included in search result page header 402 for quick identification but is also provided in search result area 404 along with search result 420, indicating that search result 420 is the search result identifying the popular web page to which button 410 links. The arrangement of items in FIG. 4 is simply one embodiment; other arrangements of items are contemplated.

In some embodiments, the popular search result buttons may be personalized either explicitly or implicitly. In explicit personalization, a user selects particular domains or web pages to always be included in the popular results or to be preferred as popular results when several web pages or domains are of similar popularity. For example, if a user has a preference for a particular online encyclopedia and would always like to have a web page associated with the encyclopedia included as a popular result link, the user simply selects the online encyclopedia's domain as one that should always be included in identified popular results. This allows the user to access a preferred resource even when the encyclopedia is not statistically a popular result for a given query.

In other embodiments, a user selection establishes a preference to include a particular domain or web page as a popular search result button when multiple web pages are determined to be approximately the same level of popularity. For example, by indicating a slight preference for a particular national news network, when several web pages are of approximately the same popularity, the user's preferred web page will appear as a popular search result button rather than one of the other similarly popular web pages. In still other embodiments, an expressed preference results in a particular domain or web page receiving a pre-determined popularity "bump" such that if a web page reaches a certain popularity threshold lower than the general popularity threshold, the web page is still included in the popular results.

In implicit personalization, user actions that are not an explicit selection of a preferred domain or web page are used to personalize the popular search results. For example, if a user's personal search history indicates that the user has browsed to a particular online encyclopedia frequently, the encyclopedia's domain will be given preference or automatically included as described above. Although the user did not explicitly request to have results associated with the encyclopedia included, the system infers this from the user's history. User demographics or geographical location may also be used to populate the popular results with certain web pages or domains. For example, if a user lives in a particular metropolitan area and that area is served by a well-respected newspaper, web pages associated with the newspaper that are relevant to the user's query are included as a popular result or given preference as described above. Demographics or search history can be obtained through logging in to a user account or through browser cookies.

In a conventional search result page, when a user clicks on a hyperlink presented in a search result, the web browser displays the hyperlinked web page and the search results page is no longer displayed. If the user subsequently navigates to additional web pages, the user loses the context of the original search, and it may be difficult for the user to easily return to the search result page. In contrast, when a user clicks on one of popular result buttons 410, 412, 414, or 416, the web page linked to the button replaces search result area 404, but search result header 402, including the popular result buttons, persists, providing the user with the context of the original search and the ability to quickly and easily access other popular web sites linked to the remaining popular result buttons. This is illustrated by search result page 500 in FIG. 5.

Figure 5:
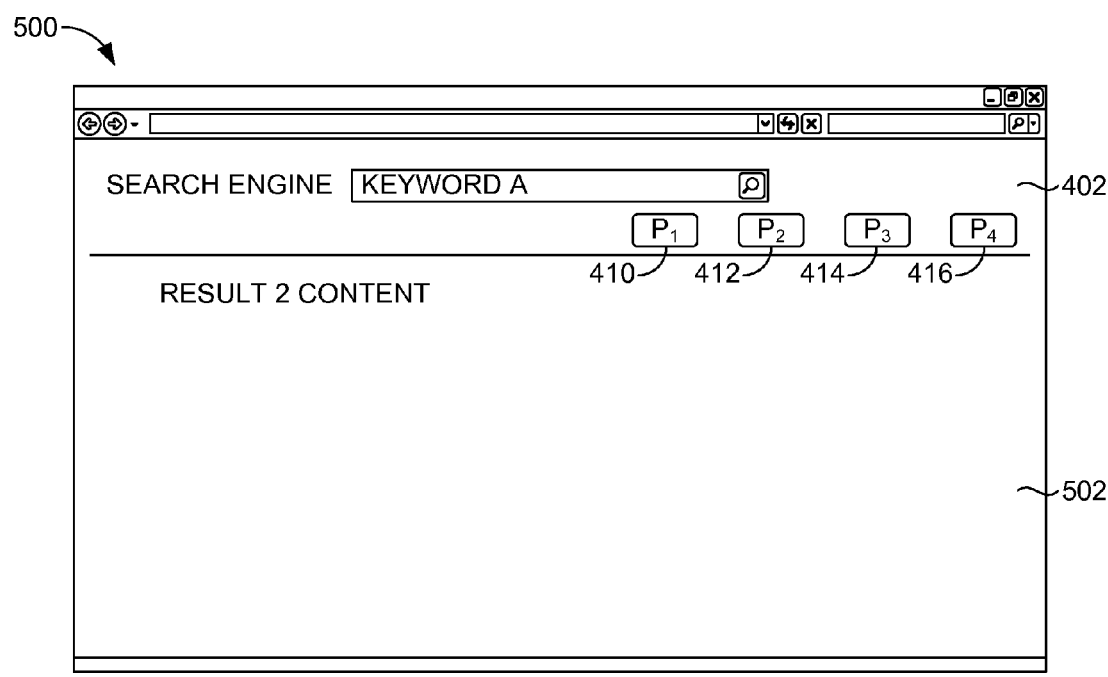
FIG. 5 is a block diagram of an exemplary user interface suitable for implementing embodiments of the present invention, the interface illustrating the second search results page including the search results page header with popular web page icons and the content of one of the popular web pages.

In FIG. 5, a user has clicked on popular result button 410, which is linked to the popular web page identified by search result 420 (Result 2) as discussed above with reference to FIG. 4. In FIG. 5, popular web page 502 has replaced search result area 404, but search result header 402, including popular result buttons 410, 412, 414, and 416, persists. After viewing popular web page 502, the user can quickly and easily click on any of the other three popular result buttons, 412, 414, and 416 to view other popular results. Any number of popular result buttons are contemplated. In some embodiments, a maximum of between four and ten buttons are contemplated to prevent the search result page header from becoming cluttered, but the number of popular result buttons is limited only by the displayed size of the search result page header. In some embodiments, rather than popular web page 502 replacing search result area 404, search result web page 500 as illustrated in FIG. 5 is generated as a new web page.

Figure 6:
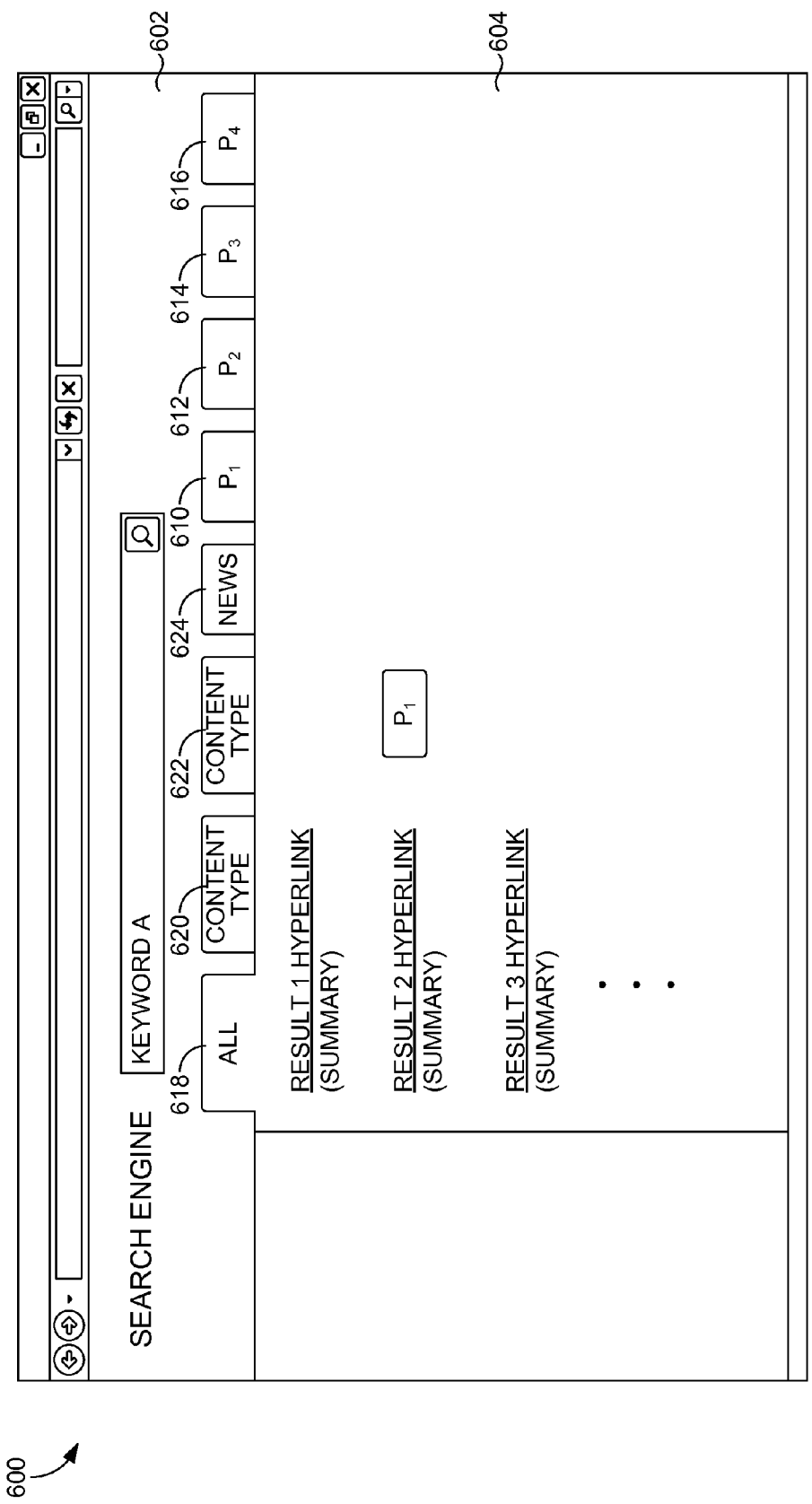
FIG. 6 is a block diagram of an exemplary user interface suitable for implementing embodiments of the present invention, where the popular web page icons are tabs.

In some embodiments, popular search results are identified by tabs or icons not presented on buttons. FIG. 6 illustrates search result page 600 where popular results are identified as tabs rather than buttons. Similarly to the popular result buttons described with regard to FIGS. 4-5, popular result tabs 610, 612, 614, and 616 link to popular web pages identified in search result area 604. Other ways of displaying popular result indicators in the search result page header are also contemplated. FIG. 6 also shows "all" tab 618, content type tabs 620 and 622, and news tab 624.

Tabs 618, 620, 622, and 624 illustrate that a variety of content items may be included in a search result page header. Depending upon the received search query, some popular web pages and some content items may be more useful to the searcher than others. In some cases, it may be determined that a particular content item is more likely to be desired than a popular search result or vice-versa. Additionally, many reasons exist for deliberately selecting and limiting items included in a search result page header. One such reason is that the search result page header is limited in size, resulting in a limited number of popular links and content items that can be included. In order to maximize the effectiveness of the information included in the search result page header, the contents must be selected strategically. Further, if the search result page header becomes cluttered or confusing, the user may not derive the intended benefit from the inclusion of popular results or other content items. Ranking may be performed to determine the number of popular result links to include in the search result page header, the number of other content items to include, and the arrangement of the links and other content items. In many instances, the ranking scheme is query dependent.

A variety of factors may be considered in ranking, including: other content items available for inclusion in the search result page header; historical click-through rate of the available content items and popular web pages; user engagement history of the available content items and popular web pages; level of popularity for the web page and associated domain; site, domain, or page quality; navigational intent; market-specific behavior; session length; and user personalization.

Other content items available for inclusion in the search result page header refers to other information, such as tabs 618, 620, 622, and 624 in FIG. 6, that may be presented along with links to typical web pages. The other content items may include links to video, audio, news stories, song lyrics, images, or other content. In some embodiments the arrangement and number of popular links in the search result page header depends upon what other content items are available. For example, if the number of other content items available is small, more popular results may be included.

User engagement history of the available content items and popular web pages refers to how users engage with content items relative to the items' position, and, once an item is clicked on, whether the user is satisfied with the landing page's content. Satisfaction can be represented by the percentage of "quick-backs" in which the user quickly recognizes that she is not interested in the landing page and returns to the search result page and abandonment, where the user simply closes the page and abandons the search after determining the landing page is not useful.

Level of popularity for the web page and associated domain refers to how popular a web page or domain is rather than just the fact that it is popular. For example, the ranking scheme may prefer the most popular of the popular web pages more than the least popular of the popular web pages. Similarly to popularity level, site, domain, or page quality refers to the overall authoritativeness of the site and may include how long a user remains on the page after navigating to the page in addition to the total number of user clicks. In some embodiments, quality is substantially the same as level of popularity.

Navigational intent refers to a determination of what a user is attempting to accomplish. For example, if a user enters the name of an online mapping service as a keyword query, the user is more likely interested in navigating to the mapping service than reading an online encyclopedia entry about the mapping service. In this example, a link directly to the service would be ranked higher than a link to an online encyclopedia entry about the service. Market-specific behavior refers to the different behaviors and expectations of different demographics and geographical regions, such as states and countries.

Search providers typically collect data relating to user behavior. Such data may include entered keywords as well as user actions after search results are viewed. For example, search providers may track which results are frequently clicked on, how long a result is viewed before the user returns to the result page, the length of the search session, how frequently advertisements are click on, etc. These and other metrics may be used either directly in the ranking process described above or indirectly to determine factors that are used in ranking.

Figure 7:
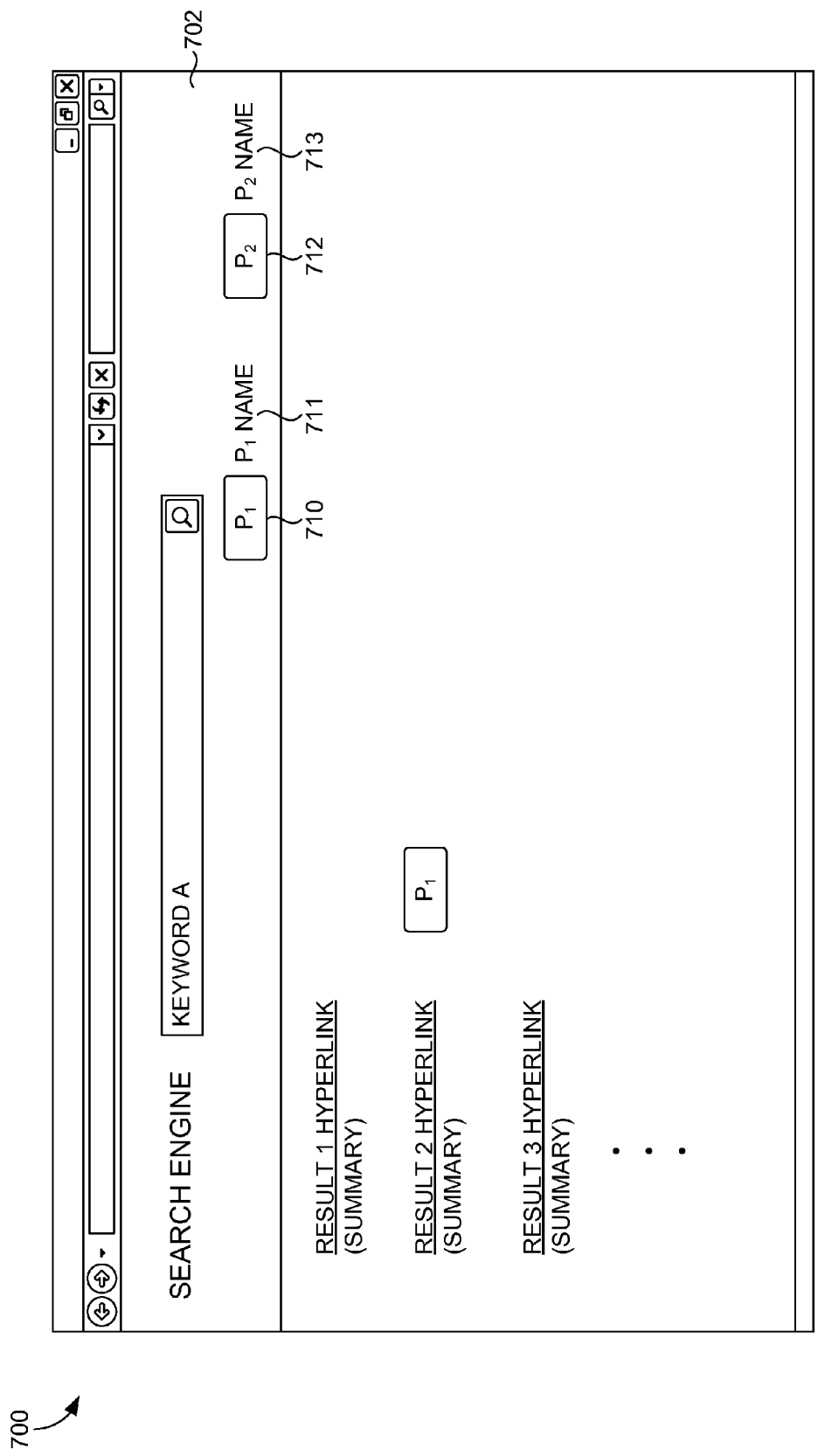
FIG. 7 is a block diagram of an exemplary user interface suitable for implementing embodiments of the present invention, where the popular web page icons each include both a button and a name associated with the web page.

FIG. 7 illustrates a search result page 700 in which popular results are identified in search result page header 702 with both a popular result button and the name of a company or entity associated with the popular web site identified by the search result. Thus, popular result button 710 displaying "P1" is presented along with the providing entity name 711 "P1 Name."

Figure 8:
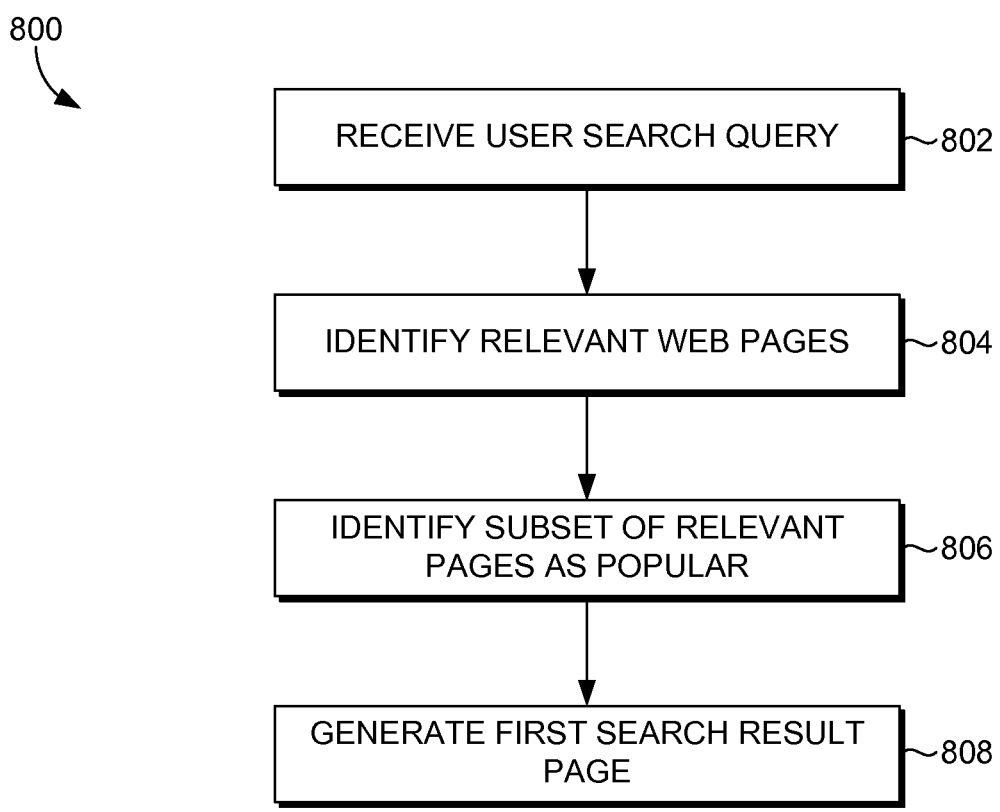
FIG. 8 is a flow chart of an exemplary method for enhancing search results.

FIG. 8 illustrates a method 800 for enhancing search results. In step 802, a user search query is received. The search query is commonly a keyword query but may also be an image query or audio or video query. In step 804, web pages relevant to the search query are identified. The ways in which search engines identify web pages relevant to a query are well known in the art and are not discussed further in this document. A subset of the web pages identified as relevant in step 804 are determined to be popular in step 806. In some embodiments, search engine query logs are analyzed to determine how many times a particular web page has been viewed in response to search queries, and this number is compared to a pre-determined popularity threshold. The threshold may be established through a variety of analytical or statistical techniques depending upon system needs or preferences. In other embodiments, information may be retrieved from the web domain hosting the web site regarding number of views.

A first search result page is generated in step 808. The search result page includes a search result listing including at least one popular web page. The search result page also includes a search result page header including a link to a corresponding popular web page. The link may be text or may be an icon such as a symbol, trademark, or image associated with a company or entity associated with the popular web page.

Figure 9:
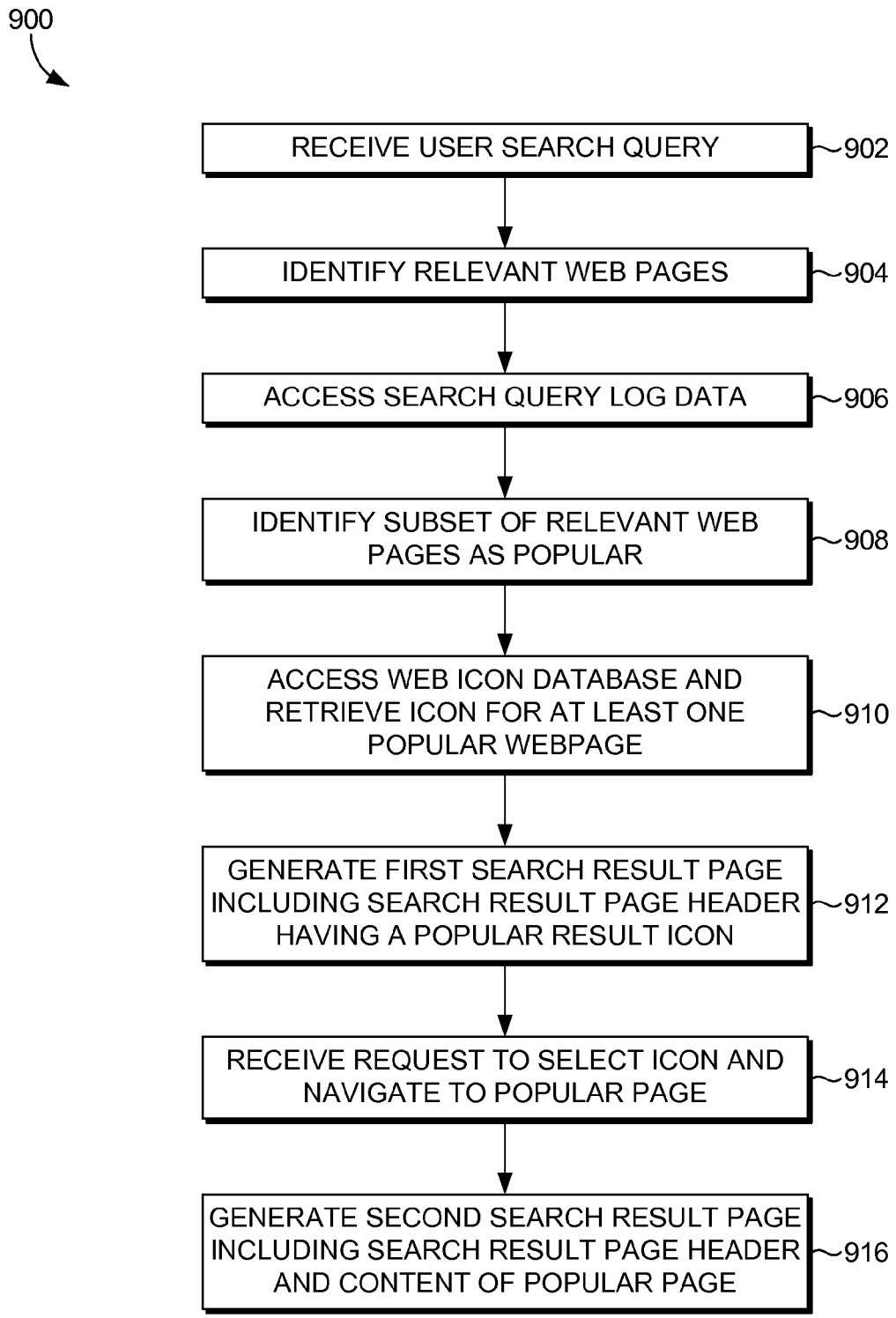
FIG. 9 is a flow chart of an exemplary method for enhancing search results in which a user click on a popular web page icon results in the generation of a second search result page including the search result page header and the popular web page icons.

FIG. 9 also illustrates a method of enhancing search results. In step 902, a user search query is received. Relevant web pages are identified in step 904. Search query log data is accessed in step 906. In step 908, the search query log data accessed in step 906 is used to identify a subset of the relevant web pages identified in step 904 as popular. A web icon database is accessed in step 910, and a web icon is retrieved for at least one popular web page. In some embodiments, a web icon database is populated with icons for a particular number (e.g. 500,000) of web pages and domains that are likely to be popular. A symbol or icon that a user is likely to understand as associated with the web page provider would typically be used. For example, if a company has a well-known corporate logo, the logo would be used as the web icon for web pages in the company's domain. The database may store more than one icon for some or all domains or web pages listed in the database. In some embodiments, web pages or domains are able to provide a preferred icon. In other embodiments, an entity's icon may not lend itself to display at a small size and an alternate icon or text is used.

In step 912, a first search result page is generated, the first search result page including a search result page header having at least one popular result icon. In step 914, a user request to select a popular result icon and navigate to the corresponding popular web page is received. In step 916, a second search result page is generated, the second search result page including the search result page header from the first search result page and the content of the popular web page.

It is possible that a given search query may not identify any relevant results that are determined to be popular. If a search engine is configured to identify, for example, the top 100 relevant web pages, and none of those 100 web pages are determined to be popular, no popular result buttons or tabs will be included in the search result page header.

In some embodiments, multiple web pages from the same domain may be identified in the search results for a particular keyword search. In cases where it is the domain that is determined to be popular and not the particular web page, rules may be implemented to determine which of the identified domains should be determined to be popular. In some embodiments, the most recently updated web page may be identified as popular. In other embodiments, the web page with the most views may be identified as popular. In still other embodiments, multiple web pages from the same domain may be identified as popular.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. A method for enhancing search results, comprising:
  receiving a search query from a user;
  identifying web pages relevant to the search query;
  identifying a subset of the relevant web pages as popular web pages;
  generating a first search result page that simultaneously displays:
    A) a search result listing that displays a respective link to each of the relevant web pages, wherein the respective links to the relevant web pages include respective links to the subset of the relevant web pages identified as popular web pages, and
    B) a subset of the search result listing separate from the search result listing, wherein the subset of the search result listing includes a respective link to each of the popular web pages in the subset of the relevant web pages, including a displayed first link to a first of the popular web pages and a displayed second link to a second of the popular web pages; and
  upon receiving a request from the user to select the first link to the first popular web page in the subset of the search result listing and navigate to the first popular web page, generating a second search result page having both content of the first popular web page and the subset of the search result listing of the first search result page, wherein the subset of the search result listing continues to display the subset of the search result listing from the original search query received from the user, including the first link to the first popular web page and the second link to the second popular web page, wherein the first link to the first popular web page and the second link to the second popular web page persist from the first search result page to the second search result page.

2. The method of claim 1, wherein a web page is popular when search query log data indicates that the web page has been accessed a number of times greater than a popularity threshold.

3. The method of claim 1, wherein the first link to the first popular web page is an icon retrieved from a web page icon database storing one or more icons for each web page or group of related web pages in the database.

4. The method of claim 1, wherein the number and arrangement of links corresponding to popular web pages and other content items included in the subset of the search result listing are selected through ranking.

5. The method of claim 1, wherein the first link to the first popular web page is at least one of an icon or text, the icon or text associated with a company or entity associated with the first one of the at least one popular web page.

6. The method of claim 1, wherein the first link to the first popular web page is displayed on a tab in the subset of the search result listing.

7. The method of claim 1, wherein at least one web page or domain is pre-selected as popular through one of: A) explicit user selection or B) system determination based on user activity history or user demographics.

8. The method of claim 1, wherein at least four popular web sites are identified, and wherein the subset of the search result listing of the first search result page includes a link for at least four of the popular web pages.

9. A system for performing a method for enhancing search results, comprising:
  a data storage that stores search query log data;
  a data storage that stores a web page icon database;
  one or more processors configured to:
    A) receive a search query from a user;
    B) identify web pages relevant to the search query;
    C) access the search query log data;
    D) for each of the relevant web pages, determine that the web page is a popular web page when the search query log data indicates that the web page has been accessed a number of times greater than a popularity threshold, wherein a plurality of popular web pages are determined;
    E) access the web page icon database storing one or more icons that identify a provider of each web page or group of related web pages in the database and retrieve an icon that identifies the provider of each web page relevant to the search query that is determined to be popular;
    F) in response to the search query from the user, generate a first search result page that simultaneously displays a search result listing and a subset of the search result listing, wherein
      i) the search result listing includes popular web pages for which icons were retrieved, and
      ii) a search result page header includes the subset of the search result listing that includes a plurality of retrieved icons that identify the providers of respective ones of the popular web pages, each icon linking to a respective popular web page,
      iii) wherein the number and arrangement of icons and other content items included in the search result page header are selected through ranking; and
    G) upon receiving a request from the user to select a first icon from the subset of the search result listing in the search result page header and navigate to a first respective popular web page, generate a second search result page having both content of the first respective popular web page and the search result page header of the first search result page, wherein the search result page header continues to display the subset of the search result listing from the original search query received from the user, including the first icon linking to the first respective popular web page and one or more other icons linking to one or more other popular web pages that were displayed on the search result page header on the first search result page.

10. The system of claim 9, wherein the ranking considers at least one of: other content items available for inclusion in the search result page header, historical click-through rate of the available content items and popular web pages, user engagement history of the available content items and popular web pages, and level of popularity for the web page and associated domain.

11. The system of claim 9, wherein the icons linking to popular web pages include symbols, trademarks, or images associated with companies or entities associated with the popular web pages.

12. The system of claim 9, wherein an icon linking to a popular web page is displayed on a tab in the search result page header.

13. The system of claim 9, wherein at least one web page or domain is pre-selected as popular through one of: (1) explicit user selection or (2) system determination based on user activity history or user demographics.

14. The system of claim 9, wherein at least four popular web sites are identified, and wherein the search result page header of the first search result page includes an icon for at least four of the popular web pages, each icon linking to the at least one web page.

15. One or more hardware memory devices having computer-executable instructions embodied thereon for generating a keyword search query user interface, the user interface comprising:
  a search result page header comprising:
    A) a keyword search query entry area capable of receiving a user keyword search query, and
    B) a subset of search results returned by the user keyword search query, identified by search result buttons that link to respective popular web pages returned in the search results by the user keyword search query, the search result buttons displayed in response to receiving the user keyword search query and determining that one or more returned web pages are popular; and
  a search result area for displaying the search results returned by the user keyword search query, comprising Internet web page links relevant to the received user keyword search query,
  wherein the search result page header, the subset of the search results, the search result area, and the search results returned by the user keyword search query, are part of a first search result page and are displayed simultaneously in response to receiving the user keyword search query, and
  wherein a user click on a first search result button linked to a first popular web page causes a generation of a second search result page comprising the search result page header and content of the first popular web page to which the first search result button is linked, wherein the subset of search results in the search results page header continue to be displayed from the first search result page to the second search result page.

16. The one or more hardware memory devices of claim 15, wherein the one or more search result buttons are icons or text associated with companies or entities associated with the popular web pages.

17. The one or more hardware memory devices of claim 15, wherein the number and arrangement of search result buttons and other content items included in the search result page header are selected through ranking.

* * * * *